United States Patent [19]

Sonoda et al.

[11] Patent Number: 4,483,843

[45] Date of Patent: Nov. 20, 1984

[54] DESULFURIZATION PROCESS FOR HYDROGEN SULFIDE CONTAINING GASES

[75] Inventors: Takezo Sonoda; Fumioki Shimoyama; Teruhisa Kaziwara; Takahisa Sato, all of Himeji, Japan

[73] Assignee: Nippon Shokubai Kagaku Kogyo Co., Ltd., Osaka, Japan

[21] Appl. No.: 408,523

[22] Filed: Aug. 16, 1982

[51] Int. Cl.$^3$ ............................................. C01B 17/05
[52] U.S. Cl. .................................. 423/573 R; 423/226
[58] Field of Search .................. 423/226, 224, 573 R, 423/573 G, 571

[56] References Cited

U.S. PATENT DOCUMENTS 4,002,727 1/1977 Sonoda et al. ........................ 423/224
4,292,293 9/1981 Johnson et al. ...................... 423/571

*Primary Examiner*—Earl C. Thomas
*Assistant Examiner*—Jeffrey E. Russel
*Attorney, Agent, or Firm*—Omri M. Behr

[57] ABSTRACT

A desulfurization process for hydrogen sulfide-containing gases, which comprises contacting an alkaline aqueous medium containing a naphthoquinone sulfonate, a water-soluble compound of at least one polyvalent metal selected from the group consisting of iron, manganese, vanadium and copper, and a water-soluble high molecular compound having weight-average molecular weight of from 300 to 50,000 with a hydrogen sulfide-containing gas thereby causing the hydrogen sulfide in said gas to be absorbed by said aqueous medium and subsequently contacting said aqueous medium now containing the absorbed hydrogen sulfide with a molecular oxygen-containing gas thereby separating elementary sulfur from said hydrogen sulfide.

13 Claims, No Drawings

DESULFURIZATION PROCESS FOR HYDROGEN SULFIDE CONTAINING GASES

BACKGROUND OF THE INVENTION

1. Field of the Invention

This invention relates to a wet process for removing hydrogen sulfide from a hydrogen sulfide-containing gas by absorption and recovering the removed hydrogen sulfide in the form of elementary sulfur, and more particularly to a process for recovering sulfur from hydrogen sulfide-containing gases by washing a hydrogen sulfide-containing gas such as coke oven gases, coal gases, flue gases from oil refineries, natural gas, flue gases from rayon plants, exhaust gases from sewage disposal plants, exhaust gases from geothermal power plants, and other similar gases containing small amounts of hydrogen sulfide, with an alkaline aqueous solution to effect absorption of hydrogen sulfide by the aqueous solution and contacting the absorbed hydrogen sulfide with molecular oxygen in the presence of a catalyst contained in the aqueous solution to separate out elementary sulfur.

Stating more particularly, this invention relates to an improvement in a process for the recovery, in the form of elementary sulfur, of hydrogen sulfide by in the aforementioned hydrogen sulfide-containing gases, which improvement resides in using, as a catalyst, a composition comprising an organic redox catalyst such as a naphthoquinone sulfonate, a polyvalent metal compound and a water-soluble high molecular compound having a weight-average molecular weight of from 300 to 50,000.

2. Description of Prior Art

Heretofore, the wet process for desulfurization of hydrogen sulfide-containing gases by the use of a catalyst comprising a naphthoquinone sulfonate has been well known as Takahax Process. One of the present inventors has suggested in U.S. Pat. No. 4,002,727 that a catalyst composition comprising a naphthoquinone sulfonate and a polyvalent metal compound, when added in a small amount to an absorbent used for the desulfurization, suppresses otherwise possible secondary production of a thiosulfate and permits recovery of sulfur to be effected in high yields.

It has been found, however, that even by the process disclosed in U.S. Pat. No. 4,002,727, the polyvalent metal compound is liable, in the course of the desulfurization and depending on the operating conditions, to form sulfides, hydroxides or oxides partially and deposit such products within the desulfurization system and that the deposits shorten the period in which the catalyst manifests high activity and, consequently, lower the ratio of sulfur recovery and suffer impurities to mingle into the recovered sulfur to an extent of degrading the hue and purity of sulfur. Further in accordance with this process, in a large scale desulfurization plant, the sulfur separated in the process, the polyvalent metal compound incorporated in the catalyst, the heavy metal compound naturally brought into the system, and the organic and inorganic impurities present in the gases under treatment are cumulatively deposited on the packing material filling the absorption tower or in the circulatory absorption line laid in the bottom of the tower, frequently to clog the system. Once the system is clogged, the operation of the plant must be stopped and the system cleaned.

An object of this invention, therefore, is to provide a novel process for the desulfurization of hydrogen sulfide-containing gases.

Another object of this invention is to provide a process for recovering elementary sulfur of high purity by subjecting hydrogen sulfide-containing gases to wet desulfurization.

Yet another object of this invention is to provide a process for the desulfurization of hydrogen sulfide-containing gases, which process precludes deposition of polyvalent metal compounds in the system and permits the operation thereof to proceed without interruption for a long time.

SUMMARY OF THE INVENTION

The objects described above are accomplished by this invention providing a desulfurization process for hydrogen sulfide-containing gases, which comprises contacting an alkaline aqueous medium containing a naphthoquinone sulfonate, a water-soluble compound of at least one polyvalent metal selected from the group consisting of iron, manganese, vanadium and copper, and a water-soluble high molecular compound having a weight-average molecular weight of from 300 to 50,000 with a hydrogen sulfide-containing gas thereby causing the hydrogen sulfide in the gas to be absorbed by the aforementioned aqueous medium and subsequently contacting the aqueous medium now containing the absorbed hydrogen sulfide with a molecular oxygen-containing gas thereby separating elementary sulfur from the hydrogen sulfide.

In this invention, the addition of the water-soluble high molecular compound is aimed at preventing the polyvalent metal compound incorporated as a promoter from being deposited within the system as described above and thereby enabling the promoter to manifest its high activity for a long time. In consequence of the addition of this high molecular compound, the recovery ratio of sulfur is notably improved and the purity of the recovered sulfur is enhanced. Besides, the dispersing ability of the water-soluble high molecular compound serves to prevent the separated sulfur from being deposited on the packing material used in the adsorption tower and from clogging the system. Thus, the plant enjoys a stable operation for a long time.

Heretofore, the deposits frequently encountered by conventional plants are composed of the separated sulfur, polyvalent metal compounds insolublized relative to the absorbent, heavy metal compounds naturally brought into the system, and the tarry substances contained in the gases under treatment. These compounds have been left to cohere and deposit within the system and induce operational troubles.

PREFERRED EMBODIMENT OF THE INVENTION

The naphthoquinone sulfonate to be used as an organic redox catalyst in the present invention is an alkali metal salt, particularly sodium salt or ammonium salt, of 1,4-naphthoquinon-2-sulfonic acid or 1,4-naphthohydroquinone-2-sulfonic acid or a mixture thereof which is readily obtained by sulfonating 1,4-naphthoquinone, for example, in the presence of an acidic sulfite and water [Journal of American Chemical Society, 57, 491–494 (1935)]. Generally, it is used in the form of a 1,4-naphthohydroquinone-2-sulfonate or a mixture thereof with a 1,4-naphthoquinone-2-sulfonate. Such an organic redox catalyst is used as incorporated in the absorbent in a concentration of from 100 to 5,000 ppm, preferably from 500 to 3,000 ppm.

The polyvalent metal compound to be used in the present invention is added as a promoter to the organic redox catalyst. It is effective in accelerating the redox reaction, suppressing secondary reactions, and heightening the recovery ratio of sulfur. Examples of the polyvalent metal compound advantageously used herein are salts, acid salts, complexes and chelate compounds of such metals as iron (Fe), manganese (Mn), vanadium (V) and copper (Cu). Such a polyvalent metal compound is used in a form incapable of forming an insoluble precipitate in the alkaline aqueous absorbent. Concrete examples of the polyvalent metal compound are iron (III) sodium oxide ($NaFeO_2$), ferrous thiocyanate, ferric thiocyanate, sodium ammonium ferricyanide, ammonium ferrocyanide, ammonium ferricyanide, sodium ferricyanide, sodium ferrocyanide, potassium ferricyanide, potassium ferrocyanide, sodium potassium ferricyanide, iron-ethylenediaminetetraacetate (ethylenediaminetetraacetate, hereinafter will be referred to as "EDTA"), manganous sulfate, ammonium manganese (II) sulfate, manganic chloride, ammonium, sodium, potassium, calcium and barium salts of permanganic acid, ammonium, sodium and potassium salts of manganic acid, potassium hexacyanomanganite, manganese acetate, manganese acetylacetonate, manganese-EDTA, sodium vanadate, ammonium metavanadate, potassium metavanadate, vanadium sulfate, vanadyl sulfate, vanadium chloride, vanadyl chloride, copper sulfate, potassium tetracyanocuprite, copper (I) thiocyanate, copper phthalocyanin, copper-EDTA and copper acetylacetonate. One such promoter or a mixture of two or more such promoters manifests its effect when it is added to the absorbent in a concentration of from 1 to 5,000 ppm, preferably from 300 to 3,000 ppm, calculated as metal ions.

This invention further uses in the alkaline aqueous absorbent a water-soluble high molecular compound having a weight-average molecular weight of from 300 to 50,000, preferably from 500 to 30,000 and possessing an ability to chelate metal ions and disperse the separated sulfur in the alkaline aqueous absorbent.

The water-soluble high molecular compound is effective in preventing the polyvalent metal compound added as a promoter from being precipitated in the form of a sulfide, a hydroxide or an oxide and consequently deprived of its catalytic activity and, at the same time, chelating ions of such metals as calcium (Ca), magnesium (Mg) and iron (Fe) which are naturally brought into the absorbent from outside the system thereby keeping the activity of the catalyst unimpaired, and preventing insoluble metal compounds from mingling into the recovered sulfur. Consequently, it notably heightens the recovery ratio of sulfur and enhances the purity and hue of the recovered sulfur to a great extent.

The typical chelating agents heretofore proposed include E.D.T.A., tartaric acid, nitrilotriacetic acid, tripolyphosphoric acid, citric acid, gluconic acid, malic acid, maleic acid, fumaric acid and alkali salts thereof. However, E.D.T.A. and nitrilotriacetic acid possess a stable chelating ability and, therefore, interfere with the retention of high catalytic activity. In contrast, tartaric acid, tripolyphosphoric acid, citric acid, gluconic acid, malic acid, maleic acid, fumaric acid and alkali salts thereof possess a poor chelating ability in the absorbent and, therefore, fail to manifest their intended effect. Or, to be effective at all, these compounds must be added in large amounts.

The addition of the water-soluble high molecular compound is further effective in preventing the separated sulfur from being deposited on the packing material used in the absorption tower owing to its own dispersing ability and efficiently dispersing the tarry substance entrained by the gases under treatment and the metal salts brought into the absorbent from outside thereby preventing such extraneous substances from being deposited within the system and allowed to clog the system.

The water-soluble high molecular compound to be used in this invention is a homopolymer of at least one vinyl compound represented by the general formula I:

wherein, $R^1$ and $R^2$ independently denote hydrogen atom or $COOX^2$, providing that $R^1$ and $R^2$ do not occur as $COOX^2$ at the same time, $R^3$ denotes hydrogen atom, methyl group or hydroxyl group, and $X^1$ and $X^2$ independently denote hydrogen atom, and alkali metal atom of ammonium group, a copolymer of two different vinyl compounds similarly represented by the aforementioned general formula I, or a copolymer of a vinyl compound represented by the general formula I and a vinyl compound represented by the general formula II:

wherein, $A^1$ denotes a hydrogen atom or a methyl group, $A^2$ denotes COOY (where, Y denotes an alkyl group of 1 to 8 carbon atoms, a hydroxyalkyl group of 2 to 5 carbon atoms or an alkanolamine group), an acid amide group, a phenyl group or a nitrile group.

Concrete examples of the vinyl compound represented by the general formula I are acrylic acid, methacrylic acid, maleic acid, fumaric acid, α-hydroxy-acrylic acid, and alkali metal salts and ammounium salts of such acids. Concrete examples of the vinyl compound represented by the general formula II are alkyl acrylates such as methyl acrylate, ethyl acryate, butyl acrylate and 2-ethylhexyl acrylate, alkyl methacrylates such as methyl methacrylate, ethyl methacrylate and butyl methacrylate, 2-hydroxyethyl acrylate, 2-hydroxyethyl methacrylate, 2-hydroxypropyl acrylate, 2-hydroxypropyl methacrylate, monoethanolamine salts and diethanolamine salts of acrylic acid, acrylamide, styrene, styrene sulfonic acid and acrylonitrile.

Particularly desirable examples of the water-soluble high molecular compound are homopolymers of vinyl compounds represented by the general formula I , copolymers of vinyl compounds of the general formula I with polyacrylic acid, polymethacrylic acid, polymaleic acid, poly(α- hydroxyacrylic acid), (meth)acrylic acid-maleic acid copolymer, (meth)acrylic acid-fumaric acid copolymer, and alkali metal salts and ammonium salts, particularly sodium and ammonium salts, thereof. Examples of the copolymer of the vinyl compound represented by the general formula I and the vinyl compound represented by the general formula II are (meth)acrylic acid-2-hydroxyethyl acrylate copolymer, (meth)acrylic acid-2-hydroxyethyl methacrylate copolymer, (meth)acrylic acid-acrylamide copolymer, (meth)acrylic acid-acrylic acid monoethanolamie salt copolymer, maleic acid-styrene sulfonic acid copolymer, alkali metal salts and ammonium salts, particularly sodium salt and ammonium salt, thereof. In each of the copolymers mentioned above, the vinyl compound represented by the general formula II accounts for not more than 50 mol%, preferably not more than 30 mol%.

One such water-soluble high molecular compound or a mixture of two or more such water-soluble high molecular compounds is used in a concentration of from 0.01 to 10 g/liter, preferably from 0.1 to 5 g/liter, more preferably 0.3 to 3.0 g/liter. It is not always required to be added in an amount exceeding the stoichiometric equivalent for thorough occlusion of metal ions present in the absorbent. When this water-soluble high molecular compound is used in conjunction with any of the chelating agents proposed to date, the effect of the addition of this compound is not impaired.

The redox catalyst, the promoter and the water-soluble high molecular compound are used as dissolved in the absorbent which is formed preponderantly of water. it is permissible to adjust the viscosity and other physical properties of the absorbent by further addition of glycerin, ethylene gylcols or propylene glycols.

Now, the present invention will be described more specifically below with reference to working examples of the invention and control.

EXAMPLE 1

An absorption column was produced by filling a jacketed glass tube 55 mm in inside diameter and 1,500 mm in height with 1,100 mm of glass beads 6 mm in diameter. A hydrogen sulfide-containing gas containing 10 g/Nm$^3$ of hydrogen sulfide in nitrogen gas was fed upwardly into the absorption column at a flow volume of 60 liters/hr. Separately, an absorbent was prepared by dissolving a catalyst composition made up of the following components:

| | |
|---|---|
| Sodium 1,4-naphthohydroquinone-2-sulfonate | 1,300 ppm |
| Vanadium ions (added as ammonium metavanadate) | 1,000 ppm |
| Iron ions (added as ferrous sulfate) | 10 ppm |
| Manganese ions (added as potassium permanganate) | 10 ppm |
| Copper ions (added as copper nitrate) | 10 ppm |
| Sodium salt of acrylic acid-maleic acid (5:1 by molar ratio) copolymer (having a weight-average molecular weight of 4,000) | 0.8 g/liter | and 50 g/liter each of sodium thiosulfate and sodium sulfate and 100 g/liter of sodium thiocyanate in water, adding thereto, as alkali sources, sodium carbonate and sodium hydrogen carbonate thereby adjusting the pH value of the resultant solution in the range of from 8.8 to 9.0. This absorbent, kept at 40° C., was sprayed downwardly into the absorption column at a flow volume of 3 liters/hr and brought into contact with the aformentioned hydrogen sulfide-containing gas.

The spent absorbent was continuously extracted downwardly from the absorption column and forwarded to an oxidation column formed of a jacketed glass tube 40 mm in inside diameter and 1,200 mm in height. Air was blown upwardly into the oxidation column via a gas distribution tube at a flow volume of 30 liters/hr to effect separation of sulfur.

In this manner, the hydrogen sulfide-containing gas was continuously treated for a period of 100 hours. The ratio of desulfurization remained above the level of 99% throughout this period.

The absorbent departing from the oxidation column was forwarded back to the absorption column via a separator serving to isolate the separated sulfur. The sulfur separated in the separator and that contained in the entire system were combined, filtered, washed with water, and dried. Consequently, there was recovered 52.6 g of slightly yellow sulfur. The purity of the recovered sulfur was 99.5%. Thus, the recovery ratio of sulfur was 94.1% based on the hydrogen sulfide treated. The remainder of the hydrogen sulfide was converted into sodium thiosulfate and sodium sulfate. The results are shown in Table 1.

EXAMPLE 2-3

The procedure of Example 1 was repeated, except that the amounts of sodium 1,4-naphthohydroquinone-sulfonate was changed to 780 ppm and 2,080 ppm respectively. The results were as shown in Table 1.

EXAMPLE 4

The procedure of Example 1 was repeated, except that the amount of vanadium ions was changed to 700 ppm. The results were as shown in Table 1.

EXAMPLE 5

The procedure of Example 1 was repeated, except that the amount of vanadium ions was changed to 1,600 ppm and the amount of the sodium salt of acrylic acid-maleic acid (5:1 by molar ratio) copolymer was changed to 1.2 g respectively. The results were as shown in Table 1.

EXAMPLES 6-7

The procedure of Example 1 was repeated, except that the amount of the sodium salt of acrylic aid-maleic acid (5:1 by molar ratio) copolymer was changed to 0.3 g and 2.0 g respectively. The results were as shown in Table 1.

EXAMPLE 8

A coke oven gas containing 6 g/Nm$^3$ of hydrogen sulfide, 1.0 g/Nm$^3$ of hydrogen cyanide and 100 mg/Nm$^3$ of tarry substance was used as a hydrogen sulfide-containing gas. The solution of catalytic composition involved in Example 1 was prepared by using water containing 30 ppm of calcium ions. The coke oven gas was desulfurized for 150 hours by following the procedure of Example 1. The ratio of desulfurization remained above the level of 99.0% and the ratio of decyanation was 99.5% or over. The sulfur separated in the sulfur separator and that contained in the system were combined, filtered, washed with water, and dried to recover 37.7 g of sulfur. The hue of the recovered sulfur was light yellow and the purity thereof was 99.2. The recovery ratio of sulfur based on the hydrogen sulfide treated was 75.0%. The remainder of the hydrogen sulfide was converted into sodium thiocyanate, sodium thiosulfate and sodium sulfate.

During the desulfurization operation, the separated sulfur and the tarry substance present in the coke oven gas were satisfactorily dispersed and were not observed to deposit on the packing material. The results are shown in Table 1.

sodium thiosulfate and sodium sulfate. The results are shown in Table 1.

TABLE 1

| | Example | | | | | | | | | Control |
|---|---|---|---|---|---|---|---|---|---|---|
| | 1 | 2 | 3 | 4 | 5 | 6 | 7 | 8 | 9 | |
| Catalyst composition | | | | | | | | | | |
| Sodium 1,4-naphthohydroquinone-2-sulfonate (ppm) | 1,300 | 780 | 2,080 | 1,300 | 1,300 | 1,300 | 1,300 | 1,300 | 1,300 | 1,300 |
| Vanadium ions (ppm) | 1,000 | 1,000 | 1,000 | 700 | 1,600 | 1,000 | 1,000 | 1,000 | 1,000 | 10 |
| Iron ions (ppm) | 10 | 10 | 10 | 10 | 10 | 10 | 10 | 10 | 10 | 10 |
| Manganese ions (ppm) | 10 | 10 | 10 | 10 | 10 | 10 | 10 | 10 | 10 | 10 |
| Copper ions (ppm) | 10 | 10 | 10 | 10 | 10 | 10 | 10 | 10 | 10 | — |
| Sodium salt of acrylic acid-maleic acid (5:1 by molar ratio) copolymer (g/liter) | 0.8 | 0.8 | 0.8 | 0.8 | 1.2 | 0.3 | 2.0 | 0.8 | 0.8 | — |
| Potassium sodium tartarate (g/liter) | — | — | — | — | — | — | — | — | — | 4.0 |
| Ratio of desulfurization (%) | 99–100 | 99–100 | 99–100 | 98–100 | 99–100 | 98–100 | 99–100 | 99–100 | 99–100 | 99–100 |
| Recovery ratio of sulfur (%) | 94.1 | 85.0 | 95.5 | 83.0 | 94.5 | 92.0 | 94.5 | 75.0 | 94.6 | 68.0 |
| Purity of recovered sulfur (%) | 99.5 | 99.0 | 99.3 | 99.0 | 99.5 | 99.0 | 99.5 | 99.2 | 99.3 | 97.5 |
| Hue of recovered sulfur | Light yellow | Light yellow | Light yellow | Light yellow | Light yellow | Light yellow | Light yellow | Light yellow | Light yellow | Grayish white |

EXAMPLE 9

A nitrogen gas containing 10 g/Nm$^3$ of hydrogen sulfide and 20 vol% of carbon dioxide was used as a hydrogen sulfide-containing gas. This gas was subjected to desulfurization treatment for 150 hours by following the procedure of Example 1. The ratio of desulfurization was 98.0%. The sulfur separated in the sulfur separator and that contained in the system were combined, filtered, washed with water, and dried to recover 78.5 g of sulfur. The hue of the recovered sulfur was light yellow and the purity thereof was 99.3%. The ratio of sulfur recovery based on the hydrogen sulfide treated was 94.6%. The remainder of the hydrogen sulfide was converted into sodium thiosulfate and sodium sulfate. When this procedure was repeated on a nitrogen gas containing carbon dioxide in a higher concentration, the results were satisfactory. The results are shown in Table 1. Control The procedure of Example 1 was repeated, except that the catalyst composition in the absorbent was made up of the following components:

| | |
|---|---|
| Sodium 1,4-naphthohydroquinone-2-sulfonate | 1,300 ppm |
| Vanadium ions | 10 ppm |
| Iron ions | 10 ppm |
| Manganese ions | 10 ppm |
| Potassium sodium tartarate | 4.0 g/liter |

The recovery ratio of sulfur was 68.0%. The remainder of the hydrogen sulfide used was converted into

EXAMPLES 10–18

The desulfurization operation of Example 1 was repeated by following the procedure of Example 1, except varying water-soluble high molecular compounds indicated below were used in the place of the sodium salt of acrylic acid-maleic acid (5:1 by molar ratio) copolymer. In the catalyst composition, copper ions were not incorporated.

- Poly(sodium acrylate) (having a weight-average molecular weight of 8,000)
- Poly(sodium maleate) (having a weight-average molecular weight of 700)
- Poly(sodium methacrylate) (having a weight-average molecular weight of 13,000)
- Poly(sodium β-hydroxyacrylate) (having a weight-average molecular weight of 30,000)
- Sodium salt of acrylic acid-fumaric acid (7:3 by molar ratio) copolymer (having a weight-average molecular weight of 3,000)
- Sodium salt of acrylic acid-2-hydroxyethyl acrylate (86:14 by molar ratio) copolymer (having a weight-average molecular weight of 15,000)
- Sodium salt of acrylic acid-acrylamide (7:3 by molar ratio) (having a weight-average molecular weight of 20,000)
- Sodium salt of maleic acid-styrene sulfonic acid (9:1 by molar ratio) (having a weight-average molecular weight of 1,000)
- Sodium salt of acrylic acid-acrylic acid ethanolamine salt (75:25 by molar ratio) (having a weight-average molecular weight of 10,000)

TABLE 2

| | Example | | | | | | | | |
|---|---|---|---|---|---|---|---|---|---|
| | 10 | 11 | 12 | 13 | 14 | 15 | 16 | 17 | 18 |
| Catalyst composition | | | | | | | | | |
| Sodium 1,4-naphthohydroquinone-2-sulfonate (ppm) | 1,300 | 1,300 | 1,300 | 1,300 | 1,300 | 1,300 | 1,300 | 1,300 | 1,300 |
| Vanadium ions (ppm) | 1,000 | 1,000 | 1,000 | 1,000 | 1,000 | 1,000 | 1,000 | 1,000 | 1,000 |
| Iron ions (ppm) | 10 | 10 | 10 | 10 | 10 | 10 | 10 | 10 | 10 |
| Maganese ions (ppm) | 10 | 10 | 10 | 10 | 10 | 10 | 10 | 10 | 10 |
| Poly (sodium acrylate) (g/liter) | 0.8 | — | — | — | — | — | — | — | — |
| Poly (sodium maleate) (g/liter) | — | 0.8 | — | — | — | — | — | — | — |
| Poly (sodium methacrylate) (g/liter) | — | — | 0.8 | — | — | — | — | — | — |
| Poly (sodium α-hydroacrylate) (g/liter) | — | — | — | 0.8 | — | — | — | — | — |
| Sodium salt of acrylic acid-fumaric acid (7:3 by molar ratio) copolymer (g/liter) | — | — | — | — | 0.8 | — | — | — | — |
| Sodium salt of acrylic acid-2-hydroxyethyl | — | — | — | — | — | 0.8 | — | — | — |

TABLE 2-continued

| | Example | | | | | | | | |
|---|---|---|---|---|---|---|---|---|---|
| | 10 | 11 | 12 | 13 | 14 | 15 | 16 | 17 | 18 |
| acrylate (86:14 by molar ratio) copolymer (g/liter) | | | | | | | | | |
| Sodium salt of acrylic acid-acrylamide (7:3 by molar ratio) copolymer (g/liter) | — | 13 | — | — | — | — | 0.8 | — | — |
| Sodium salt of maleic acid-styrene sulfonic acid (9:1 by molar ratio) copolymer (g/liter) | — | — | 13 | — | — | — | — | 0.8 | — |
| Sodium salt of acrylic acid-acrylic acid ethanolamine salt (75:25 by molar ratio) copolymer (g/liter) | — | — | — | — | — | — | — | — | 0.8 |
| Ratio of desulfurization (%) | 99–100 | 99–100 | 99–100 | 99–100 | 99–100 | 99–100 | 98–100 | 98–100 | 98–100 |
| Recovery ratio of sulfur (%) | 94.0 | 94.0 | 93.5 | 93.5 | 94.0 | 93.0 | 93.0 | 92.5 | 92.5 |
| Purity of recovered sulfur (%) | 99.6 | 99.5 | 99.0 | 99.2 | 99.5 | 99.2 | 99.0 | 99.0 | 99.0 |
| Hue of recovered sulfur | Light yellow | Light yellow | Light yellow | Light yellow | Light yellow | Light yellow | Light yellow | Light yellow | Light yellow |

What is claimed is:

1. A desulfurization process for hydrogen sulfide-containing gases, which comprises contacting an alkaline aqueous medium containing a naphthoquinone sulfonate at a concentration of 500–4000 ppm, a water-soluble compound of at least one polyvalent metal selected from the group consisting of iron, manganese, vanadium and copper at a concentration of 300–3000 ppm, and a water-soluble high molecular compound having weight-average molecular weight from 300 to 500 at a concentration of 0.1–10 gm/l with a hydrogen sulfide-containing gas thereby causing the hydrogen sulfide in said gas to be absorbed by said aqueous medium and subsequently contacting said aqueous medium now containing the absorbed hydrogen sulfide with a molecular oxygen-containing gas thereby separating elementary sulfur from said hydrogen sulfide.

2. A process according to claim 1, wherein said water-soluble high molecular compound is at least one member selected from the group consisting of homopolymers of vinyl compounds represented by the general formula I:

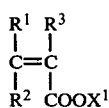

wherein, $R^1$ and $R^2$ independently denote hydrogen atom or $COOX^2$, providing that $R^1$ and $R^2$ do not occur as $COOX^2$ at the same time, $R^3$ denotes hydrogen atom, methyl group or hydroxyl group, and $X^1$ and $X^2$ independently denote hydrogen atom, an alkali metal atom or ammonium group, copolymers of different vinyl compounds similarly represented by said general formula I, and copolymers of vinyl compounds represented by said general formula I and vinyl compounds represented by the general formula II:

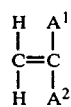

wherein, $A^1$ denotes hydrogen atom or methyl group, $A^2$ denotes COOY (where, Y denotes an alkyl group of 1 to 8 carbon atoms, a hydroxyalkyl group of 2 to 5 carbon atoms, or an alkanolamine group), an acid amide group, phenyl group or a nitrile group.

3. A process according to claim 2, wherein said water-soluble high molecular compound is a homopolymer of a vinyl compound represented by said general formula I.

4. A process according to claim 2, wherein said water-soluble high molecular compound is a copolymer of different vinyl compounds represented by said general formula I.

5. A process according to claim 2, wherein said water-soluble high molecular compound is a copolymer of a vinyl compound represented by said general formula I and a vinyl compound represented by said general formula II.

6. A process according to claim 5, wherein said vinyl compound represented by said general formula II in said copolymer accounts for not more than 50 mol%.

7. A process according to claim 5, wherein said vinyl compound represented by said general formula II in said copolymer accounts for not more than 30 mol%.

8. A process according to claim 1, wherein the concentration of said water-soluble molecular compound is from 0.1 to 5 g/liter.

9. A process according to claim 1, wherein the weight-average molecular weight of said water-soluble high molecular compound is in the range of from 500 to 20,000.

10. A process according to claim 3, wherein said homopolymer of said vinyl compound represented by said general formula I is the sodium or ammonium salt of one homopolymer selected from the group consisting of polyacrylic acid, polymaleic acid, polymethacrylic acid and poly(α-hydroxyacrylic acid).

11. A process according to claim 4, wherein said copolymer of said different vinyl compounds represented by said general formula I is the sodium or ammonium salt of acrylic acid-maleic acid copolymer or acrylic acid-fumaric acid copolymer.

12. A process according to claim 5, wherein said copolymer of said vinyl compound represented by said general formula I and said vinyl compound represented by said general formula II is the sodium or ammonium salt of a copolymer of acrylic acid and a compound selected from the group consisting of 2-hydroxyethyl acrylate, acrylamide, styrene-sulfonic acid and ethanolamine acrylate.

13. A process according to claim 11, wherein said copolymer is the sodium or ammonium salt of acrylic acid-maleic acid copolymer.

* * * * *